United States Patent
Manfredi

(10) Patent No.: US 10,833,506 B1
(45) Date of Patent: Nov. 10, 2020

(54) HYBRID POWER GENERATOR

(71) Applicant: Robert Manfredi, Stony Point, NY (US)

(72) Inventor: Robert Manfredi, Stony Point, NY (US)

(*) Notice: Subject to any disclaimer, the term of this patent is extended or adjusted under 35 U.S.C. 154(b) by 0 days.

(21) Appl. No.: 16/512,511

(22) Filed: Jul. 16, 2019

(51) Int. Cl.
    *H02J 3/38* (2006.01)
    *H02J 4/00* (2006.01)
    *H02J 3/28* (2006.01)

(52) U.S. Cl.
    CPC .............. *H02J 3/38* (2013.01); *H02J 3/28* (2013.01); *H02J 4/00* (2013.01)

(58) Field of Classification Search
    CPC ............. H02J 3/28; H02J 3/38; H02J 4/00
    USPC ................... 307/43, 64, 65, 66, 84
    See application file for complete search history.

(56) References Cited

U.S. PATENT DOCUMENTS

| | | |
|---|---|---|
| D311,516 S | 10/1990 | Geisler, Jr. |
| 8,295,033 B2 | 10/2012 | van Straten |
| 8,598,741 B2 | 12/2013 | Kim |
| 8,752,380 B2 | 6/2014 | Cheung |
| 9,316,124 B2 | 4/2016 | Jin |
| 9,496,752 B2 | 11/2016 | Shimura |
| 2004/0055313 A1* | 3/2004 | Navedo ............... F25D 11/003 62/6 |
| 2006/0066105 A1* | 3/2006 | Johnson ............ H01M 8/04201 290/1 A |
| 2007/0296276 A1* | 12/2007 | Blackman ............... H02J 5/00 307/64 |
| 2010/0084208 A1* | 4/2010 | Chen ................... B60L 58/34 180/65.31 |
| 2010/0207452 A1* | 8/2010 | Saab .................... F03D 9/007 307/65 |
| 2011/0176256 A1* | 7/2011 | Van Straten ............ F03D 9/007 361/601 |
| 2014/0277791 A1* | 9/2014 | Lenard ................ F02D 29/06 700/287 |
| 2015/0280489 A1* | 10/2015 | Curlett ................. F21L 13/00 307/66 |
| 2017/0302218 A1* | 10/2017 | Janik .................... H02J 7/35 |
| 2018/0198290 A1 | 7/2018 | Rohera |
| 2018/0367096 A1* | 12/2018 | McCormack ........... F21L 4/08 |

FOREIGN PATENT DOCUMENTS

WO 2017009692 1/2017

* cited by examiner

*Primary Examiner* — William Hernandez
(74) *Attorney, Agent, or Firm* — Kyle A. Fletcher, Esq.

(57) ABSTRACT

The hybrid power generator is an emergency electric power generator. The hybrid power generator is configured to generate AC electrical power that is suitable for use in circumstances where the national electric grid has failed. The hybrid power generator comprises a housing and a power reserve circuit. The housing contains the power reserve circuit. The power reserve circuit: a) generates electrical energy using a fuel source; b) generates electrical energy using a photoelectric cell; c) stores the generated electrical energy as chemical potential energy; and, d) distributes the generated and stored electrical energy for use as AC electrical energy.

17 Claims, 2 Drawing Sheets

HYBRID POWER GENERATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and electricity generation including circuit arrangements for AC distribution networks, more specifically, a circuit arrangement for feeding a single AC network from two or more generators and converters. (H02J3/38)

SUMMARY OF INVENTION

The hybrid power generator is an emergency electric power generator. The hybrid power generator is configured to generate AC electrical power that is suitable for use in circumstances where the national electric grid has failed. The hybrid power generator comprises a housing and a power reserve circuit. The housing contains the power reserve circuit. The power reserve circuit: a) generates electrical energy using a fuel source; b) generates electrical energy using a photoelectric cell; c) stores the generated electrical energy as chemical potential energy; and, d) distributes the generated and stored electrical energy for use as AC electrical energy.

These together with additional objects, features and advantages of the hybrid power generator will be readily apparent to those of ordinary skill in the art upon reading the following detailed description of the presently preferred, but nonetheless illustrative, embodiments when taken in conjunction with the accompanying drawings.

In this respect, before explaining the current embodiments of the hybrid power generator in detail, it is to be understood that the hybrid power generator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hybrid power generator.

It is therefore important that the claims be regarded as including such equivalent construction insofar as they do not depart from the spirit and scope of the hybrid power generator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
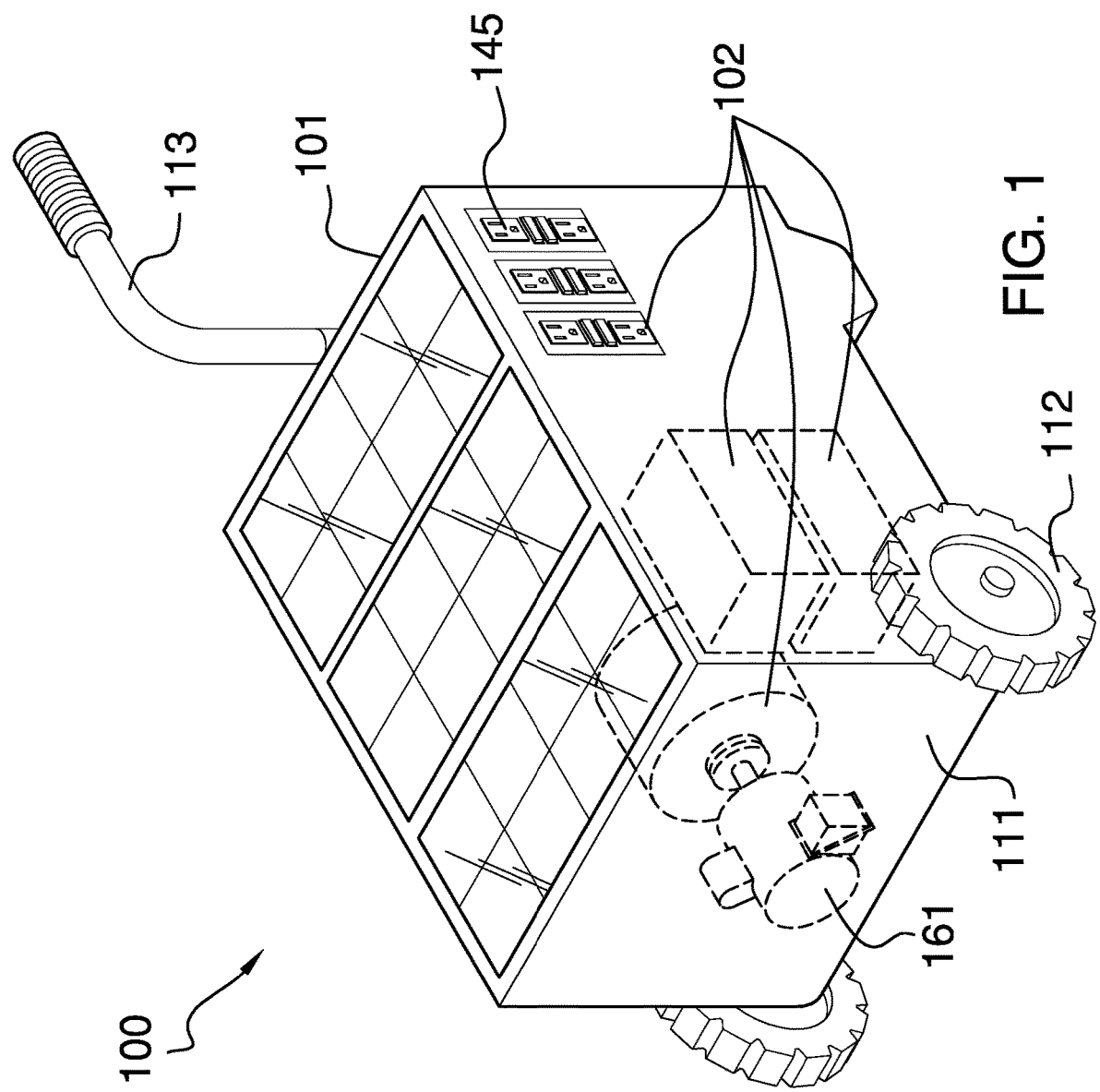
FIG. 1 is a perspective view of an embodiment of the disclosure.
Figure 2:
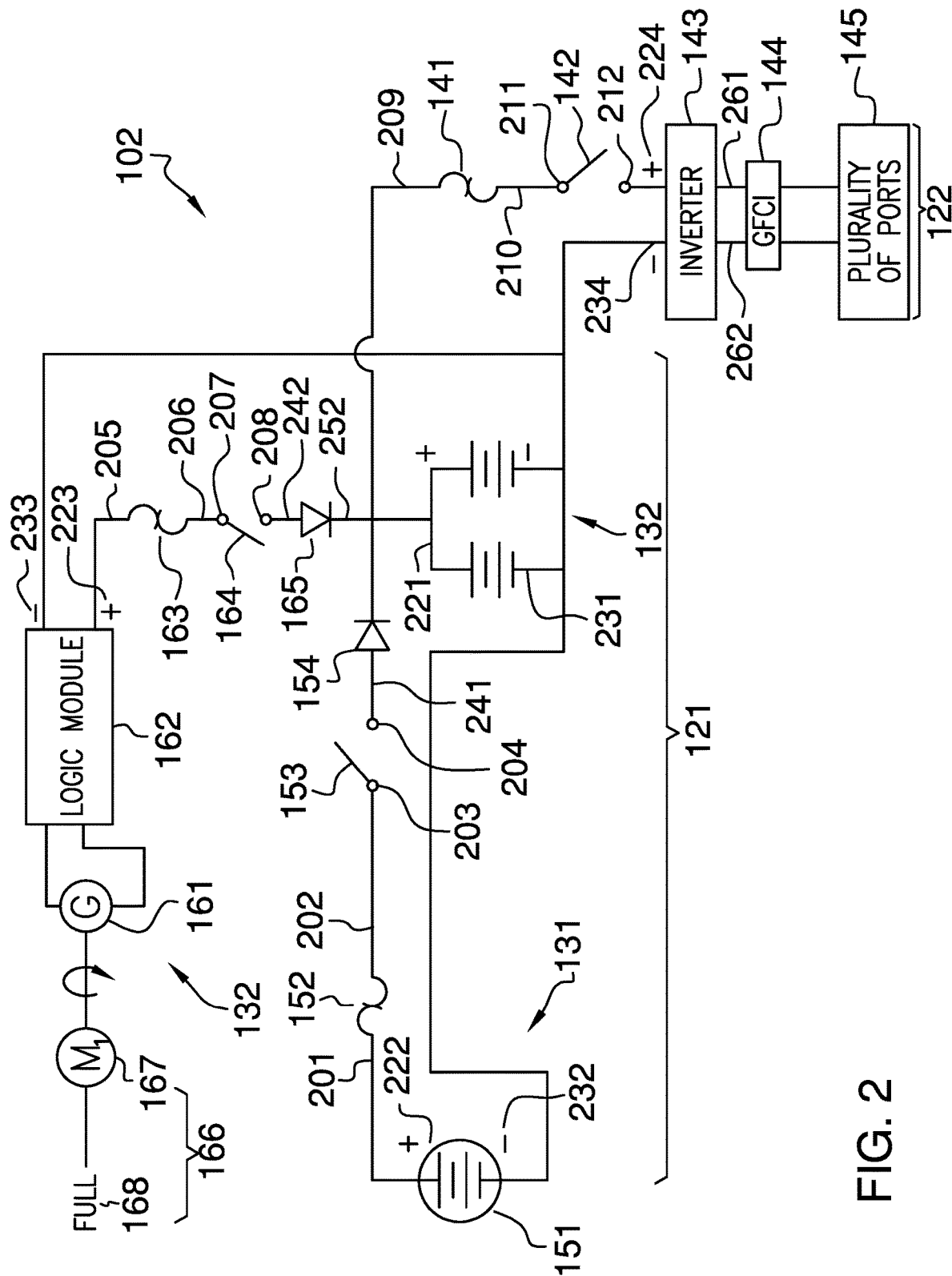
FIG. 2 is a schematic view of an embodiment of the disclosure.

Detailed reference will now be made to one or more potential embodiments of the disclosure, which are illustrated in FIGS. 1 through 2.

The hybrid power generator 100 (hereinafter invention) is an emergency electric power generator. The invention 100 is configured to generate AC electrical power that is suitable for use in circumstances where the national electric grid has failed. The invention 100 comprises a housing 101 and a power reserve circuit 102. The housing 101 contains the power reserve circuit 102. The power reserve circuit 102: a) generates electrical energy using a fuel source 168; b) generates electrical energy using a photoelectric device; c) stores the generated electrical energy as chemical potential energy; and, d) distributes the generated and stored electrical energy for use as AC electrical energy.

The housing 101 is a rigid structure. The housing 101 contains the power reserve circuit 102. The housing 101 is formed with all apertures and form factors necessary to allow the housing 101 to accommodate the use, the operation, and the external connections of the power reserve circuit 102. Methods to form a housing 101 suitable for the purposes described in this disclosure are well-known and documented in the mechanical arts. The housing 101 comprises a shell 111, a plurality of wheels 112, and a handle 113.

The shell 111 is a rigid structure. The shell 111 forms the primary structure of the housing 101. The shell 111 forms the exterior surfaces of the housing 101. The shell 111 contains the power reserve circuit 102. The shell 111 is formed with all apertures and form factors necessary to allow the shell 111 to accommodate the use and operation of the power reserve circuit 102. Methods to form a shell 111 suitable for the purposes described in this disclosure are well-known and documented in the mechanical arts.

The plurality of wheels 112 attach to the exterior surface of the shell 111 such that each of the plurality of wheels 112 rotates freely. The plurality of wheels 112 allow the housing 101 to roll into position. The handle 113 is a grip that attaches to the exterior surface of the shell 111. The handle 113 is used to manipulate the housing 101.

The power reserve circuit 102 generates AC electrical energy. The power reserve circuit 102 generates DC electrical energy from a fuel source 168. The power reserve circuit 102 generates DC electrical energy from a photovoltaic cell 151. The power reserve circuit 102 stores the generated DC electrical energy as chemical potential energy. The power reserve circuit 102 converts the chemical potential energy into DC electrical energy. The power reserve circuit 102 converts the DC electrical energy into AC electrical energy. The power reserve circuit 102 distributes the AC electrical energy. The power reserve circuit 102 comprises a power generation circuit 121 and a power distribution system 122.

The power generation circuit 121 is an electrical subcircuit of the power reserve circuit 102. The power generation circuit 121 generates the electrical power that is stored and consumed by the invention 100. The power generation circuit 121 generates DC electrical energy from a fuel source 168. The power generation circuit 121 generates DC electrical energy from a photovoltaic cell 151. The power generation circuit 121 converts the chemical potential energy into DC electrical energy. The power generation circuit 121 comprises a photovoltaic system 131, a generator circuit 132, and a battery 133. The battery 133 is further defined with a first positive terminal 221 and a first negative terminal 231. The photovoltaic system 131, the generator circuit 132, and the battery 133 are electrically interconnected.

The battery 133 is an electrochemical device. The battery 133 converts chemical potential energy into the electrical energy used to power the power distribution system 122. The battery 133 is a commercially available rechargeable battery 133.

The photovoltaic system 131 is an electrical subcircuit of the power generation circuit 121. The photovoltaic system 131 converts electromagnetic radiation into DC electrical energy. The photovoltaic system 131 provides the DC electrical energy directly to the battery 133. The photovoltaic system 131 comprises a photovoltaic cell 151, a first circuit breaker 152, a first isolation switch 153, and a first diode 154. The first circuit breaker 152 is further defined with a first lead 201 and a second lead 202. The first isolation switch 153 is further defined with a third lead 203 and a fourth lead 204. The photovoltaic cell 151 is further defined with a second positive terminal 222 and a second negative terminal 232. The first diode 154 is further defined with a first anode 241 and a first cathode 251. The photovoltaic cell 151, the first circuit breaker 152, the first isolation switch 153, and the first diode 154 are electrically interconnected.

The photovoltaic cell 151 is an electrical device. The photovoltaic cell 151 converts electromagnetic radiation into DC electrical energy. The DC electrical energy generated by the photovoltaic cell 151 is stored as chemical potential energy in the battery 133. The photovoltaic cell 151 is defined elsewhere in this disclosure. The use of a photovoltaic cell 151 is well-known and documented in the electrical arts.

The first circuit breaker 152 electrically connects in series between the photovoltaic cell 151 and the first isolation switch 153. The first circuit breaker 152 automatically opens the power feed into the first isolation switch 153, the first diode 154 and the battery 133 when too much electric current is flowing through the first circuit breaker 152.

The first isolation switch 153 is a maintained electrical switch. The first isolation switch 153 electrically connects in series between the first circuit breaker 152 and the first diode 154 The first isolation switch 153 controls the flow of current into the first diode 154. The first isolation switch 153 is used to isolate the photovoltaic cell 151 from the balance of the power reserve circuit 102

The first diode 154 is an electrical device that isolates the photovoltaic system 131 from: a) the generator circuit 132; b) the battery 133; and, c) the power distribution system 122.

The chemical energy stored within the rechargeable battery 133 is renewed and restored through the use of the photovoltaic system 131. The photovoltaic system 131 is an electrical circuit that reverses the polarity of the rechargeable battery 133 and provides the energy necessary to reverse the chemical processes that the rechargeable battery 133 initially used to generate the electrical energy. This reversal of the chemical process creates a chemical potential energy that will later be used by the rechargeable battery 133 to generate electricity.

The photovoltaic system 131 receives electrical energy from the photovoltaic cell 151. The first diode 154 is an electrical device that allows current to flow in only one direction. The first diode 154 installs between the rechargeable battery 133 and the photovoltaic system 131 such that electricity will not flow from the first positive terminal 221 of the rechargeable battery 133 into the second positive terminal 222 of the photovoltaic cell 151.

The generator circuit 132 is an electrical subcircuit of the power generation circuit 121. The generator circuit 132 converts energy from a fuel source 168 into DC electrical energy. The generator circuit 132 provides the DC electrical energy directly to the battery 133. The generator circuit 132 comprises an electric generator 161, an AC/DC converter 162, a second circuit breaker 163, a second isolation switch 164, a second diode 165, and a drive system 166. The second circuit breaker 163 is further defined with a fifth lead 205 and a sixth lead 206. The second isolation switch 164 is further defined with a seventh lead 207 and an eighth lead 208. The AC/DC converter 162 is further defined with a third positive terminal 223 and a third negative terminal 233. The second diode 165 is further defined with a second anode 242 and a second cathode 252. The electric generator 161, the AC/DC converter 162, the second circuit breaker 163, the second isolation switch 164, and the second diode 165 are electrically interconnected. The drive system 166 mechanically attaches to the electric generator.

The electric generator 161 is an electric generator 161. The electric generator 161 is powered using the drive system 166. The electric generator 161 is defined elsewhere in this disclosure. The drive system 166 is a mechanical system that generates rotational energy. The drive system 166 attaches to the electric generator 161 such that the rotation of the drive system 166 transfers the rotational energy required by the electric generator 161 to generate electrical energy. The drive system 166 comprises an internal combustion engine 167 and a fuel source 168. The internal combustion engine 167 is a combustion engine. The internal combustion engine 167 generates the rotational energy required by the electric generator 161. The fuel source 168 provides the fuel required by the internal combustion engine 167 to operate. The fuel source 168 is externally provided.

The AC/DC converter 162 is an electrical device. The AC/DC converter 162 converts AC electrical energy into DC electrical energy. The AC/DC converter 162 is defined elsewhere in this disclosure.

The second circuit breaker 163 electrically connects in series between the AC/DC converter 162 and the second isolation switch 164. The second circuit breaker 163 automatically opens the power feed into the second isolation switch 164, the second diode 165 and the battery 133 when too much electric current is flowing through the second isolation switch 164.

The second isolation switch 164 is a maintained electrical switch. The second isolation switch 164 electrically connects in series between the second circuit breaker 163 and the second diode 165. The second isolation switch 164 controls the flow of current into the second diode 165. The second isolation switch 164 is used to isolate the AC/DC converter 162 from the balance of the power reserve circuit 102. The second isolation switch 164 is an electrical device that isolates the AC/DC converter 162 from: a) the second diode 165; b) the battery 133; and, c) the power distribution system 122.

The second diode 165 is an electrical device that isolates the generator circuit 132 from: a) the photovoltaic system 131; b) the battery 133; and, c) the power distribution system 122.

The chemical energy stored within the rechargeable battery 133 is further renewed and restored through the use of the generator circuit 132. The generator circuit 132 is an electrical circuit that reverses the polarity of the rechargeable battery 133 and provides the energy necessary to reverse the chemical processes that the rechargeable battery 133 initially used to generate the electrical energy. This reversal of the chemical process creates a chemical potential energy that will later be used by the rechargeable battery 133 to generate electricity.

The generator circuit 132 receives electrical energy from the electric generator 161 and the AC/DC converter 162. The second diode 165 is an electrical device that allows current to flow in only one direction. The second diode 165 installs between the rechargeable battery 133 and the AC/DC converter 162 such that electricity will not flow from the first positive terminal 221 of the rechargeable battery 133 into the third positive terminal 223 of the AC/DC converter 162.

The power distribution system 122 is an electrical sub-circuit of the power reserve circuit 102. The power distribution system 122 distributes the electrical power that is provisioned by the invention 100. The power distribution system 122 draws DC electrical energy from the power generation circuit 121. The power distribution system 122 converts the DC electrical energy into AC electrical energy. The power distribution system 122 distributes the AC electrical energy.

The power distribution system 122 comprises a third circuit breaker 141, a third isolation switch 142, an inverter 143, a ground fault interrupter circuit 144, and a plurality of distribution ports 145. The third circuit breaker 141 is further defined with a ninth lead 209 and a tenth lead 210. The third isolation switch 142 is further defined with an eleventh lead 211 and a twelfth lead 212. The inverter 143 is further defined with a fourth positive terminal 224 and a fourth negative terminal 234. The inverter 143 is further defined with a hot lead 261 and a neutral lead 262. The third circuit breaker 141, the third isolation switch 142, the inverter 143, the ground fault interrupter circuit 144, and the plurality of distribution ports 145 are electrically interconnected.

The third circuit breaker 141 is an electrical device. The third circuit breaker 141 is a normally closed automatic switch. The third circuit breaker 141 electrically connects in series between the battery 133 and the third isolation switch 142. The third circuit breaker 141 automatically opens the power feed into the third isolation switch 142 and the inverter 143 when too much electric current is flowing through the third circuit breaker 141.

The third isolation switch 142 is a maintained electrical switch. The third isolation switch 142 electrically connects in series between the third circuit breaker 141 and the inverter 143. The third isolation switch 142 controls the flow of current into the inverter 143. The third isolation switch 142 is effectively the power switch for the power distribution system 122.

The inverter 143 is an electric circuit. The inverter 143 converts DC electrical energy into AC electrical energy. The inverter 143 is powered by the battery 133. The inverter 143 is defined elsewhere in this disclosure.

The ground fault interrupter circuit 144 is an electrical device. The ground fault interrupter circuit 144 disables the flow of electricity from the inverter 143 into the plurality of distribution ports 145 when the ground fault interrupter circuit 144 detects an improper ground connection within the circuits supported by the plurality of distribution ports 145. The ground fault interrupter circuit 144 is defined elsewhere in this disclosure.

Each of the plurality of distribution ports 145 is an electrical port that distributes the AC electrical energy generated by the inverter 143 to an electrical device that is plugged into the electrical port. In the first potential embodiment of the disclosure, each of the plurality of distribution ports 145 is identical. Each of the plurality of distribution ports 145 is a NEMA 5-15 electrical socket.

The terms anode, cathode, hot lead 261 and neutral lead 262 are defined elsewhere in this disclosure.

The following six paragraphs describe the assembly of the power reserve circuit 102.

The electric generator 161 electrically connects to the AC/DC converter 162 to provide the AC/DC converter 162 with AC electrical energy.

The third positive terminal 223 of the electric generator 161 electrically connects to the fifth lead 205 of the second circuit breaker 163. The sixth lead 206 of the second circuit breaker 163 electrically connects to the seventh lead 207 of the second isolation switch 164. The eighth lead 208 of the second isolation switch 164 electrically connects to the second anode 242 of the second diode 165. The second cathode 252 of the second diode 165 electrically connects to the first positive terminal 221 of the battery 133.

The second positive terminal 222 of the photovoltaic cell 151 electrically connects to the first lead 201 of the first circuit breaker 152. The second lead 202 of the first circuit breaker 152 electrically connects to the third lead 203 of the first isolation switch 153. The fourth lead 204 of the first isolation switch 153 electrically connects to the first anode 241 of the first diode 154. The first cathode 251 of the first diode 154 electrically connects to the first positive terminal 221 of the battery 133.

The first positive terminal 221 of the battery 133 electrically connects to the ninth lead 209 of the third circuit breaker 141. The tenth lead 210 of the third circuit breaker 141 electrically connects to the eleventh lead 211 of the third isolation switch 142. The twelfth lead 212 of the third isolation switch 142 electrically connects to the fourth positive terminal 224 of the inverter 143.

The hot lead 261 and the neutral lead 262 of the inverter 143 electrically connect to the ground fault interrupter circuit 144. The plurality of distribution ports 145 draws AC electrical energy directly from the ground fault interrupter circuit 144.

The second negative terminal 232 of the photovoltaic cell 151 electrically connects to the first negative terminal 231 of the battery 133. The third negative terminal 233 of the AC/DC converter 162 electrically connects to the first negative terminal 231 of the battery 133. The fourth negative terminal 234 of the inverter 143 electrically connects to the first negative terminal 231 of the battery 133.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a chemical device consisting of one or more cells, in which chemical energy is converted into electricity and used as a source of power. Batteries are commonly defined with a positive terminal and a negative terminal.

Circuit Breaker: As used in this disclosure, a circuit breaker is a normally closed maintained switch that automatically actuates to an open position should a dangerous condition (such as overcurrent or ground fault) be detected.

Combustion engine: As used in this disclosure, a combustion engine is an engine powered by burning fuel within the engine. Two common examples would be: 1) internal combustion engines; and, 2) engines designed with one or more cylinders where combustion takes place within the cylinder.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Engine: As used in this disclosure, an engine is a device with moving parts that is used to convert energy into rotational or linear motion.

Form Factor: As used in this disclosure, the term form factor refers to the size and shape of an object.

Fuel: As used in this disclosure, fuel refers to a substance that undergoes a chemical combustion reaction to release chemical potential energy.

Generator: In this disclosure, a generator is a machine that converts rotational mechanical energy into electric energy. A generator typically comprises a stator and a rotor. The stator is a stationary hollow cylindrical structure that forms a magnetic field. The rotor is a rotating cylindrical structure that is coaxially mounted in the stator. The rotation of the rotor within the stator physically generates the electrical energy. A generator can generate an electrical voltage selected from the group consisting of an AC voltage and a DC voltage. When a DC voltage is generated, this disclosure assumes that the term generator includes commutator and electrical circuitry required to generate a regulated DC voltage.

Grip: As used in this disclosure, a grip is an accommodation formed on or within an object that allows the object to be grasped or manipulated by a hand.

Ground Fault Interrupter: As used in this disclosure, a ground fault interrupter is a circuit breaker that is actuated when a "ground fault" is detected. The ground fault interrupter is inserted into a protected electrical circuit such that all authorized electrical currents entering and leaving the protected electrical circuit are routed through the ground fault interrupter. The ground fault interrupter detects the ground fault by comparing the current entering protected electrical circuit through the ground fault interrupter and the current exiting the protected electrical circuit through the ground fault interrupter. Should a current mismatch be detected the ground fault interrupter actuates to the open position. A ground fault interrupter is also referred to as a ground fault circuit interrupter. A ground fault interrupter is often called a GFCI.

Handle: As used in this disclosure, a handle is an object by which a tool, object, or door is held or manipulated with the hand.

Hot Lead and Neutral Lead: As used in this disclosure, a hot lead is the source of the electric current that is provided by a voltage source. A neutral lead is the return for the electric current that is provisioned through the hot lead back to the voltage source.

Housing: As used in this disclosure, a housing is a rigid structure that encloses and protects one or more devices.

Inverter: As used in this disclosure, an inverter is an electrical device that converts a DC voltage into an AC voltage. Methods to design and build inverters are well known in the electrical arts.

Maintained Switch: A used in this disclosure, a maintained switch is a switch that maintains the position that was set in the most recent switch actuation. A maintained switch works in an opposite manner to a momentary switch.

Motor: As used in this disclosure, a motor refers to the method of transferring energy from an external power source into rotational mechanical energy.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter.

NEMA: As used in this disclosure, NEMA is an acronym for National Electric Manufacturers Association. NEMA is a manufacturer's association known for publishing widely accepted technical standards regarding the performance of electrical power distribution equipment.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMA5-15 electrical socket comprises a plurality of electric ports from which electric power is drawn. The position of each of the plurality of electric ports is placed in a standardized position. The typical NEMA5-15 electrical socket further comprises a plate hole which is a standardized hole located in a standardized position within the NEMA 5-15 electrical socket that that is designed to receive a bolt that is used to attach a faceplate to the NEMA 5-15 electrical socket. The NEMA 5-15 electrical socket is also commonly referred to as an electrical outlet.

NEMA 1-15P Electrical Plug: As used in this disclosure, the NEMA 1-15P Electrical Plug is a plug that is designed to be inserted into a NEMA 5-15 Electrical Socket for the purpose of delivering electrical power to electrical devices. The NEMA 1-15P Electrical Plug is a 2 blade plug that is commonly found within residential and office environments within the United States.

NEMA 5-15P Electrical Plug: As used in this disclosure, the NEMA 5-15P Electrical Plug is a plug that is designed to be inserted into a NEMA 5-15 Electrical Socket for the purpose of delivering electrical power to electrical devices. The NEMA 5-15P Electrical Plug is a 3 blade plug that is commonly found within residential and office environments within the United States.

Normally Closed: As used in this disclosure, normally closed refers to an externally controlled electrical switching device, such as a relay or a momentary switch, which passes electric current when the externally controlled electrical switching device is in an unpowered state.

Normally Open: As used in this disclosure, normally open refers to an externally controlled electrical switching device, such as a relay or a momentary switch, which does not pass electric current when the externally controlled electrical switching device is in an unpowered state.

Plug: As used in this disclosure, a plug is an electrical termination that electrically connects a first electrical circuit to a second electrical circuit or a source of electricity. As used in this disclosure, a plug will have two or three metal pins.

Photovoltaic Cell: As used in this disclosure, a photovoltaic cell is an electrical device that directly converts light energy into electrical energy.

Port: As used in this disclosure, a port is an electrical termination that is used to connect a first electrical circuit to a second external electrical circuit. In this disclosure, the port is designed to receive a plug.

Rigid Structure: As used in this disclosure, a rigid structure is a solid structure formed from an inelastic material that resists changes in shape. A rigid structure will permanently deform as it fails under a force.

Roll: As used in this disclosure, the term roll refers to the motion of an object that is facilitated by the rotation of one or more wheels or casters.

Shell: As used in this disclosure, a shell is a structure that forms an outer covering intended to contain an object. Shells are often, but not necessarily, rigid or semi-rigid structures that are intended to protect the object contained within it.

Shell: As used in this disclosure, a shell refers to the exterior surfaces of an object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 2 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A circuit arrangement comprising:
a housing and a power reserve circuit;
wherein the housing contains the power reserve circuit;
wherein the circuit arrangement is configured to generate AC electrical power;
wherein the power reserve circuit generates electrical energy using a fuel source;
wherein the power reserve circuit generates electrical energy using a photoelectric device;
wherein the power reserve circuit stores the generated electrical energy as chemical potential energy;
wherein the power reserve circuit distributes the generated and stored electrical energy for use as AC electrical energy;
wherein the power reserve circuit generates AC electrical energy;
wherein the power reserve circuit generates DC electrical energy from a fuel source;
wherein the power reserve circuit generates DC electrical energy from a photovoltaic cell;
wherein the power reserve circuit stores the generated DC electrical energy as chemical potential energy;
wherein the power reserve circuit converts the chemical potential energy into DC electrical energy;
wherein the power reserve circuit converts the DC electrical energy into AC electrical energy;
wherein the power reserve circuit distributes the AC electrical energy;
wherein the photovoltaic system comprises a photovoltaic cell, a first circuit breaker, a first isolation switch, and a first diode;
wherein the photovoltaic cell, the first circuit breaker, the first isolation switch, and the first diode are electrically interconnected;
wherein the first circuit breaker is further defined with a first lead and a second lead;

wherein the first isolation switch is further defined with a third lead and a fourth lead;
wherein the photovoltaic cell is further defined with a second positive terminal and a second negative terminal;
wherein the first diode is further defined with a first anode and a first cathode.

2. The circuit arrangement according to claim 1
wherein the housing comprises a shell, a plurality of wheels, and a handle;
wherein the plurality of wheels attach to the exterior surface of the shell;
wherein the handle is a grip that attaches to the exterior surface of the shell.

3. The circuit arrangement according to claim 2
wherein the shell is a rigid structure;
wherein the shell forms the primary structure of the housing;
wherein the shell forms the exterior surfaces of the housing;
wherein the shell contains the power reserve circuit;
wherein the plurality of wheels attach to the exterior surface of the shell such that each of the plurality of wheels rotates freely.

4. The circuit arrangement according to claim 3
wherein the power reserve circuit comprises a power generation circuit and a power distribution system;
wherein the power generation circuit is an electrical subcircuit of the power reserve circuit;
wherein the power generation circuit generates the electrical power that is stored and consumed by the circuit arrangement;
wherein the power distribution system is an electrical subcircuit of the power reserve circuit;
wherein the power distribution system distributes the electrical power that is provisioned by the circuit arrangement.

5. The circuit arrangement according to claim 4
wherein the power generation circuit generates DC electrical energy from a fuel source;
wherein the power generation circuit generates DC electrical energy from a photoelectric device;
wherein the power generation circuit converts chemical potential energy into DC electrical energy.

6. The circuit arrangement according to claim 5
wherein the power distribution system draws DC electrical energy from the power generation circuit;
wherein the power distribution system converts the DC electrical energy into AC electrical energy;
wherein the power distribution system distributes the AC electrical energy.

7. The circuit arrangement according to claim 6
wherein the power generation circuit comprises a photovoltaic system, a generator circuit, and a battery;
wherein the photovoltaic system, the generator circuit, and the battery are electrically interconnected;
wherein the battery is an electrochemical device;
wherein the battery is a rechargeable battery;
wherein the battery is further defined with a first positive terminal and a first negative terminal.

8. The circuit arrangement according to claim 7
wherein the photovoltaic system is an electrical subcircuit of the power generation circuit;
wherein the photovoltaic system converts electromagnetic radiation into DC electrical energy;
wherein the photovoltaic system provides the DC electrical energy directly to the battery;
wherein the photovoltaic system reverses the polarity of the rechargeable battery;
wherein the generator circuit is an electrical subcircuit of the power generation circuit;
wherein the generator circuit converts energy from a fuel source into DC electrical energy;
wherein the generator circuit reverses the polarity of the rechargeable battery.

9. The circuit arrangement according to claim 8
wherein the generator circuit comprises an electric generator, an AC/DC converter, a second circuit breaker, a second isolation switch, a second diode, and a drive system;
wherein the electric generator, the AC/DC converter, the second circuit breaker, the second isolation switch, and the second diode are electrically interconnected;
wherein the drive system mechanically attaches to the electric generator;
wherein the second circuit breaker is further defined with a fifth lead and a sixth lead;
wherein the second isolation switch is further defined with a seventh lead and an eighth lead;
wherein the AC/DC converter is further defined with a third positive terminal and a third negative terminal;
wherein the second diode is further defined with a second anode and a second cathode.

10. The circuit arrangement according to claim 9
wherein the power distribution system comprises a third circuit breaker, a third isolation switch, an inverter, a ground fault interrupter circuit, and a plurality of distribution ports;
wherein the third circuit breaker, the third isolation switch, the inverter, the ground fault interrupter circuit, and the plurality of distribution ports are electrically interconnected;
wherein the third circuit breaker is further defined with a ninth lead and a tenth lead;
wherein the third isolation switch is further defined with an eleventh lead and a twelfth lead;
wherein the inverter is further defined with a fourth positive terminal and a fourth negative terminal;
wherein the inverter is further defined with a hot lead and a neutral lead.

11. The circuit arrangement according to claim 10
wherein the photovoltaic cell is an electrical device;
wherein the photovoltaic cell converts electromagnetic radiation into DC electrical energy;
wherein the DC electrical energy generated by the photovoltaic cell is stored as chemical potential energy in the battery;
wherein the first circuit breaker electrically connects in series between the photovoltaic cell and the first isolation switch;
wherein the first circuit breaker automatically opens the power feed into the first isolation switch, the first diode and the battery when too much electric current is flowing through the first circuit breaker;
wherein the first isolation switch is a maintained electrical switch;
wherein the first isolation switch electrically connects in series between the first circuit breaker and the first diode;
wherein the first isolation switch controls the flow of current into the first diode;
wherein the first isolation switch isolates the photovoltaic cell from the balance of the power reserve circuit wherein the first diode is an electrical device that isolates the photovoltaic system from: a) the generator circuit; b) the battery; and, c) the power distribution system;
wherein the first diode is an electrical device that allows current to flow in only one direction;
wherein the first diode installs between the rechargeable battery and the photovoltaic system such that electricity will not flow from the first positive terminal of the rechargeable battery into the second positive terminal of the photovoltaic cell.

12. The circuit arrangement according to claim 11
wherein the electric generator generates electrical energy;
wherein the electric generator is powered using the drive system;
wherein the drive system is a mechanical system that generates rotational energy;
wherein the drive system attaches to the electric generator such that the rotation of the drive system transfers the rotational energy required by the electric generator.

13. The circuit arrangement according to claim 12
wherein the AC/DC converter is an electrical device;
wherein the AC/DC converter converts AC electrical energy into DC electrical energy;
wherein the second circuit breaker electrically connects in series between the AC/DC converter and the second isolation switch;
wherein the second circuit breaker automatically opens the power feed into the second isolation switch, the second diode, and the battery when too much electric current is flowing through the second isolation switch;
wherein the second isolation switch is a maintained electrical switch;
wherein the second isolation switch electrically connects in series between the second circuit breaker and the second diode;
wherein the second isolation switch controls the flow of current into the second diode;
wherein the second isolation switch isolates the AC/DC converter from the balance of the power reserve circuit;
wherein the second isolation switch is an electrical device that isolates the AC/DC converter from: a) the second diode; b) the battery; and, c) the power distribution system;
wherein the second diode is an electrical device that isolates the generator circuit from: a) the photovoltaic system; b) the battery; and, c) the power distribution system;
wherein the second diode is an electrical device that allows current to flow in only one direction;
wherein the second diode installs between the rechargeable battery and the AC/DC converter such that electricity will not flow from the first positive terminal of the rechargeable battery into the third positive terminal of the AC/DC converter.

14. The circuit arrangement according to claim 13
wherein the third circuit breaker is an electrical device;
wherein the third circuit breaker is a normally closed automatic switch;
wherein the third circuit breaker electrically connects in series between the battery and the third isolation switch;
wherein the third circuit breaker automatically opens the power feed into the third isolation switch and the inverter when too much electric current is flowing through the third circuit breaker;
wherein the third isolation switch is a maintained electrical switch;
wherein the third isolation switch electrically connects in series between the third circuit breaker and the inverter;
wherein the third isolation switch controls the flow of current into the inverter;
wherein the third isolation switch is effectively the power switch for the power distribution system;
wherein the inverter is an electric circuit;
wherein the inverter converts DC electrical energy into AC electrical energy;
wherein the inverter is powered by the battery.

15. The circuit arrangement according to claim 14
wherein the ground fault interrupter circuit is an electrical device;
wherein the ground fault interrupter circuit disables the flow of electricity from the inverter into the plurality of distribution ports when the ground fault interrupter circuit detects an improper ground connection within the circuits supported by the plurality of distribution ports;
wherein each of the plurality of distribution ports is an electrical port that distributes the AC electrical energy generated by the inverter to an electrical device plugged into the electrical port.

16. The circuit arrangement according to claim 15
wherein the drive system comprises an internal combustion engine and a fuel source;
wherein the internal combustion engine is a combustion engine;
wherein the internal combustion engine generates the rotational energy required by the electric generator;
wherein the fuel source provides the fuel required by the internal combustion engine to operate.

17. The circuit arrangement according to claim 16
wherein the electric generator electrically connects to the AC/DC converter to provide the AC/DC converter with AC electrical energy;
wherein the third positive terminal of the electric generator electrically connects to the fifth lead of the second circuit breaker;
wherein the sixth lead of the second circuit breaker electrically connects to the seventh lead of the second isolation switch;
wherein the eighth lead of the second isolation switch electrically connects to the second anode of the second diode;
wherein the second cathode of the second diode electrically connects to the first positive terminal of the battery;
wherein the second positive terminal of the photovoltaic cell electrically connects to the first lead of the first circuit breaker;
wherein the second lead of the first circuit breaker electrically connects to the third lead of the first isolation switch;
wherein the fourth lead of the first isolation switch electrically connects to the first anode of the first diode;
wherein the first cathode of the first diode electrically connects to the first positive terminal of the battery;
wherein the first positive terminal of the battery electrically connects to the ninth lead of the third circuit breaker;
wherein the tenth lead of the third circuit breaker electrically connects to the eleventh lead of the third isolation switch;
wherein the twelfth lead of the third isolation switch electrically connects to the fourth positive terminal of the inverter;

wherein the hot lead and the neutral lead of the inverter electrically connect to the ground fault interrupter circuit;

wherein the plurality of distribution ports draws AC electrical energy directly from the ground fault interrupter circuit;

wherein the second negative terminal of the photovoltaic cell electrically connects to the first negative terminal of the battery;

wherein the third negative terminal of the AC/DC converter electrically connects to the first negative terminal of the battery;

wherein the fourth negative terminal of the inverter electrically connects to the first negative terminal of the battery.

* * * * *